US009477050B2

(12) United States Patent
Megason et al.

(10) Patent No.: US 9,477,050 B2
(45) Date of Patent: Oct. 25, 2016

(54) CONNECTOR MODULES HAVING OPTICAL CONNECTORS MOVEABLE BETWEEN A RETRACTED POSITION AND AN EXTENDED POSITION

(71) Applicant: HEWLETT PACKARD ENTERPRISE DEVELOPMENT LP, Houston, TX (US)

(72) Inventors: George D. Megason, Spring, TX (US); Kevin B. Leigh, Houston, TX (US); David W. Sherrod, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/976,180

(22) Filed: Dec. 21, 2015

(65) Prior Publication Data
US 2016/0103285 A1    Apr. 14, 2016

Related U.S. Application Data

(63) Continuation of application No. 14/370,165, filed as application No. PCT/US2012/020434 on Jan. 6, 2012, now Pat. No. 9,217,832.

(51) Int. Cl.
*G02B 6/10* (2006.01)
*G02B 6/38* (2006.01)
(Continued)

(52) U.S. Cl.
CPC .......... *G02B 6/3897* (2013.01); *G02B 6/3628* (2013.01); *G02B 6/4261* (2013.01); *G02B 6/4292* (2013.01); *G02B 6/43* (2013.01); *G02B 6/4452* (2013.01); *Y10T 29/49826* (2015.01)

(58) Field of Classification Search
CPC    G02B 6/4292; G02B 6/4246; G02B 6/4201; G02B 6/4452; G02B 6/3897; G02B 6/4454; Y02E 30/40; B21D 53/88; B23O 15/00
USPC .................. 385/88–89, 92, 134–135; 29/428
See application file for complete search history.

(56) References Cited

U.S. PATENT DOCUMENTS 5,339,379 A    8/1994    Kutsch et al.
5,666,134 A    9/1997    Browne
(Continued)

FOREIGN PATENT DOCUMENTS

CN    101793999    8/2010
JP    H07-105777    4/1995
(Continued)

OTHER PUBLICATIONS

International patent application, PCT/US12/20438, entitled "Connector Modules to Optically Connect to Electronic Devices", filed Jan. 6, 2012 (30 pages).
(Continued)

*Primary Examiner* — Ellen Kim
(74) *Attorney, Agent, or Firm* — Trop, Pruner & Hu, P.C.

(57) ABSTRACT

A plurality of connector modules are mounted to a support frame. The connector modules have respective optical connectors to optically connect with respective electronic devices, where the optical connectors are moveable between a retracted position and an extended position. The optical connector of a first of the connector modules is retractable and extendable independently of a second of the connector modules.

18 Claims, 7 Drawing Sheets

(51) Int. Cl.
    *G02B 6/42*                 (2006.01)
    *G02B 6/43*                 (2006.01)
    *G02B 6/36*                 (2006.01)
    *G02B 6/44*                 (2006.01)

(56) References Cited

U.S. PATENT DOCUMENTS

| | | | |
|---|---|---|---|
| 5,883,998 A | 3/1999 | Stevens et al. | |
| 5,953,473 A | 9/1999 | Shimotsu | |
| 5,980,312 A | 11/1999 | Chapman et al. | |
| 6,305,848 B1 | 10/2001 | Gregory | |
| 6,623,177 B1 | 9/2003 | Chilton | |
| 6,682,230 B1* | 1/2004 | Demangone | G02B 6/3821 385/60 |
| 6,707,978 B2* | 3/2004 | Wakileh | G02B 6/4455 385/134 |
| 6,786,647 B1* | 9/2004 | Hinds | G02B 6/3825 385/55 |
| 7,284,911 B2 | 10/2007 | Takeda et al. | |
| 7,310,474 B2* | 12/2007 | Kanasaki | G02B 6/4453 385/134 |
| 7,588,373 B1 | 9/2009 | Sato et al. | |
| 7,645,160 B2* | 1/2010 | Tabet | G02B 6/3897 439/540.1 |
| 8,231,283 B2* | 7/2012 | Sabo | G02B 6/3885 385/120 |
| 8,886,002 B2* | 11/2014 | Hubbard | G02B 6/4442 348/92 |
| 2010/0054685 A1 | 3/2010 | Cooke et al. | |
| 2010/0067854 A1 | 3/2010 | Oki | |
| 2010/0226610 A1 | 9/2010 | Kobayashi et al. | |
| 2010/0254667 A1 | 10/2010 | He | |
| 2011/0268441 A1 | 11/2011 | Goldstein et al. | |

FOREIGN PATENT DOCUMENTS

| | | |
|---|---|---|
| JP | H11-243563 | 9/1999 |
| JP | 2002-311298 | 10/2002 |

OTHER PUBLICATIONS

International patent application, PCT/US12/20442, entitled "Connector Module Having a Moveable Optical Connector", filed Jan. 6, 2012 (25 pages).

ISA/KR, International Search Report, mailed Jul. 31, 2012, PCT/US2012/020434, filed Jan. 6, 2014 (9 pages).

Motorola Inc., Model GX2 Omnistar, "Optical Broadband Transmission Platform", Advanced Media Technologies, 2004, Deerfield Beach, FL, pp. 1-2.

\* cited by examiner

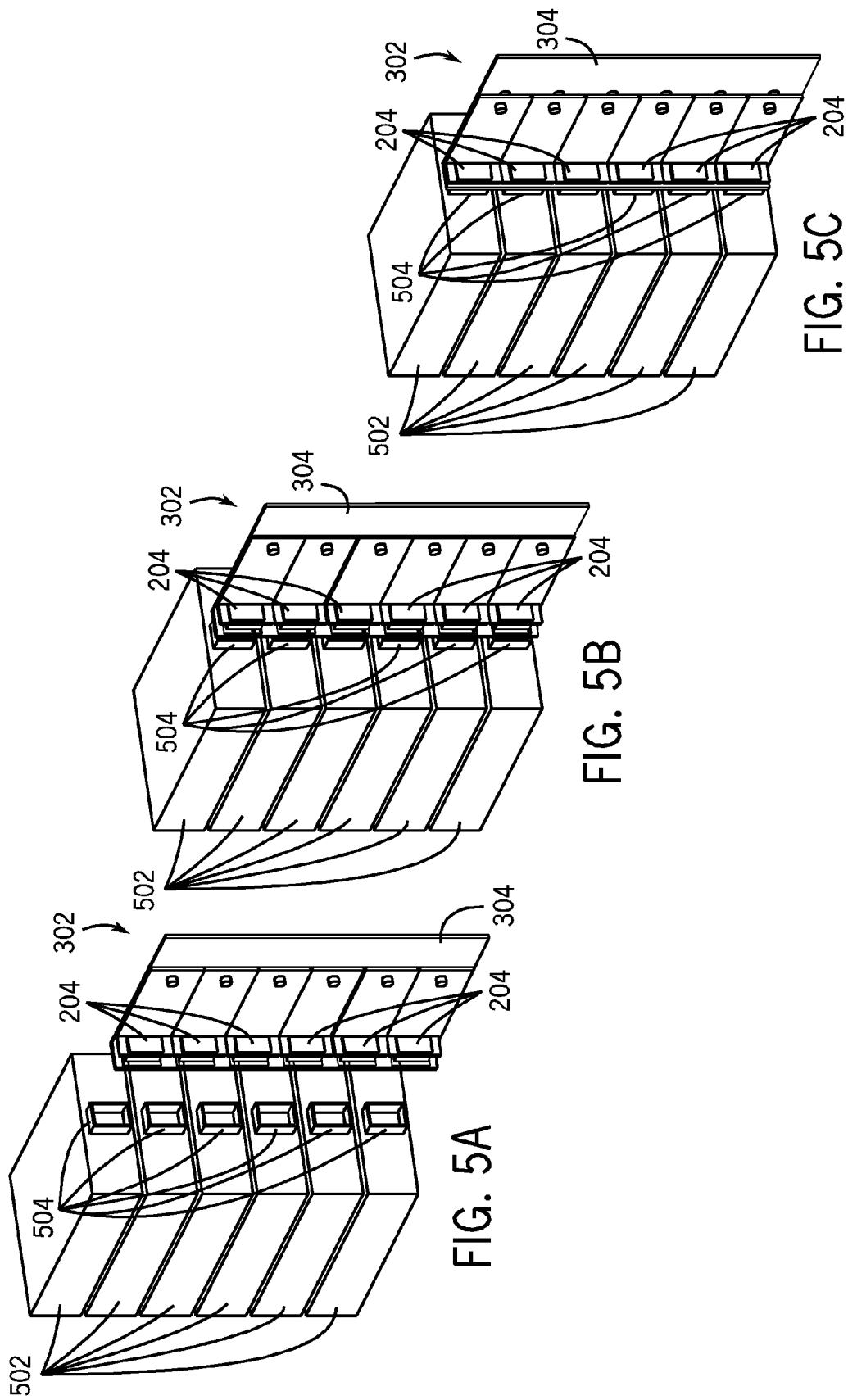

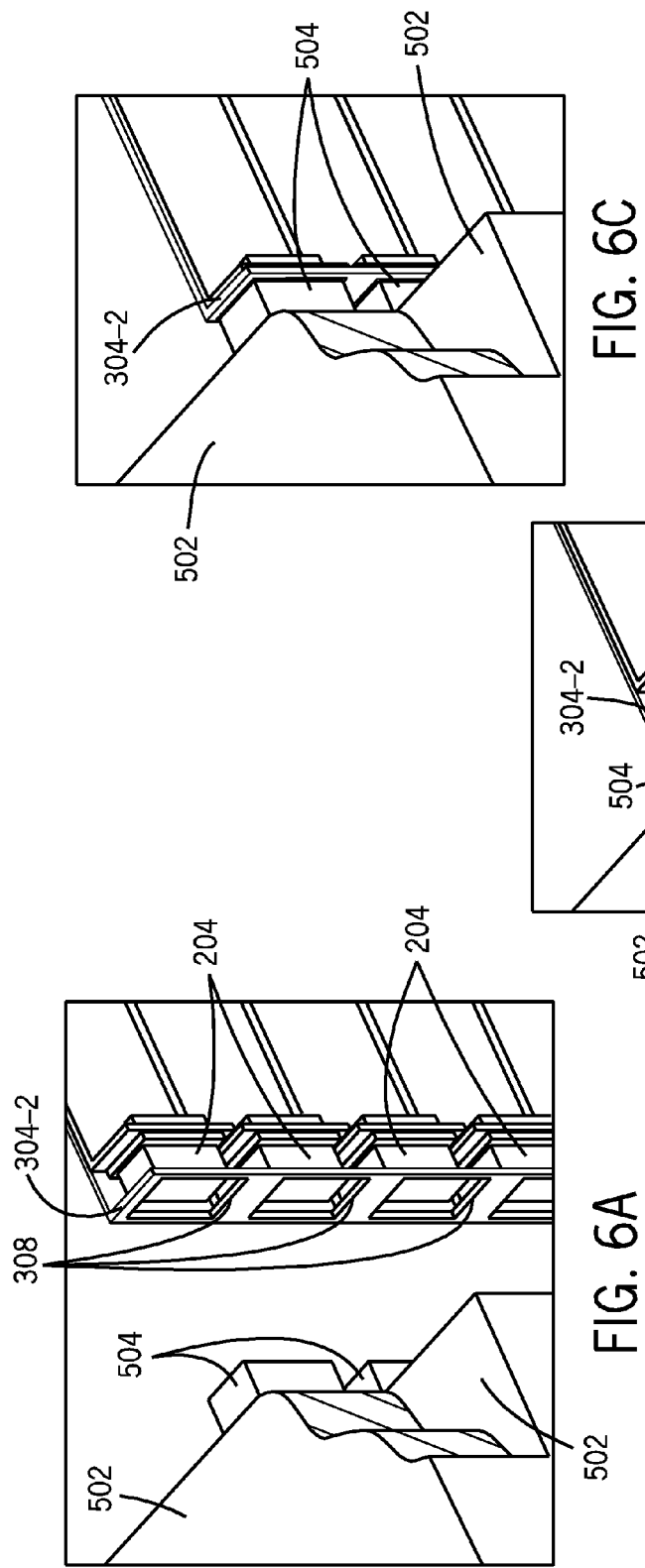

CONNECTOR MODULES HAVING OPTICAL CONNECTORS MOVEABLE BETWEEN A RETRACTED POSITION AND AN EXTENDED POSITION

CROSS REFERENCE TO RELATED APPLICATIONS

This is a continuation of U.S. application Ser. No. 14/370,165, filed Jul. 1, 2014, which is a national stage application under 35 U.S.C. §371 of PCT/US2012/020434, filed Jan. 6, 2012, both hereby incorporated by reference.

BACKGROUND

A system can include multiple electronic devices. To allow communication with the electronic devices, a backplane infrastructure can be provided in the system, where the backplane infrastructure has connectors to connect with respective mating connectors of the electronic devices. The connectors of the backplane infrastructure can include optical connectors to optically connect to respective electronic devices.

BRIEF DESCRIPTION OF THE DRAWINGS

Some embodiments are described with respect to the following figures:

FIGS. 5A-5C and 6A-6C illustrate an example of connecting a connector infrastructure according to some implementations with an arrangement of electronic devices;

DETAILED DESCRIPTION

Figure 1:
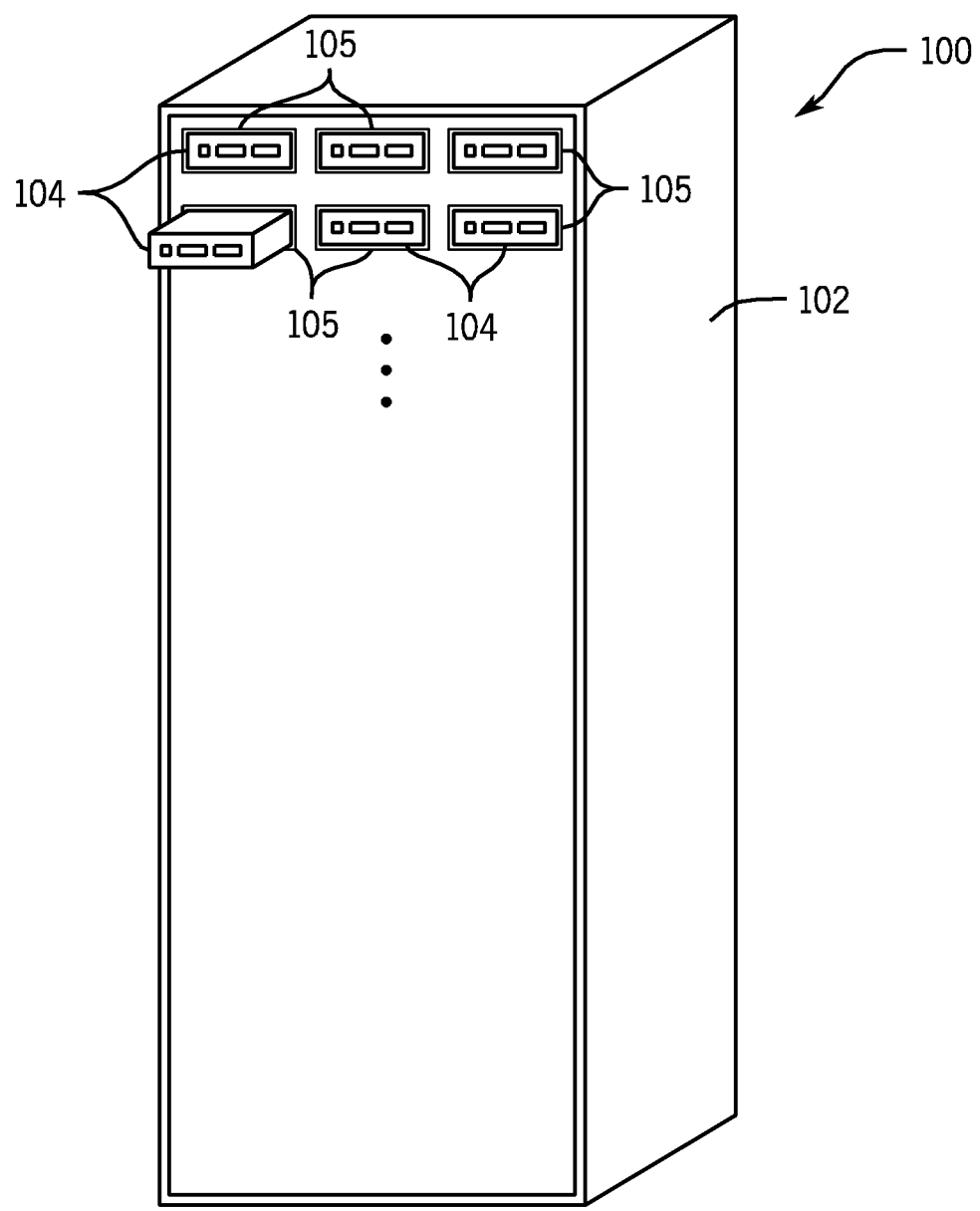
FIG. 1 is a schematic perspective view of a rack including electronic devices according to some implementations.

Electronic devices, such as processing devices, storage devices, communications devices, management devices, and so forth, can be mounted in a rack, which includes a frame and other support elements for holding the electronic devices. The rack provides receptacles into which the electronic devices can be inserted. The rack can also include a backplane infrastructure for connection to the electronic devices that have been inserted into the rack. Generally, the backplane infrastructure can include a support structure to which connectors are attached. When electronic devices are mounted in the rack, connectors on the electronic devices can mate with connectors of the backplane infrastructure. The connectors of the backplane infrastructure are connected to communications media (e.g. optical fibers, electrical wires, etc.) to allow for communication with the electronic devices.

A backplane infrastructure can include optical connectors for optical connection with respective optical connectors of the electronic devices. It is noted that the electronic devices and the connector infrastructure can also include electrical connectors for electrically connecting the electronic devices to the backplane infrastructure. In the ensuing discussion, reference is made to just optical connectors—note, however, that it is to be understood that various components discussed below can also additionally include electrical connectors.

In some examples, a backplane infrastructure can include an integrated and fixed arrangement of optical connectors for connection to respective electronic devices. An integrated and fixed arrangement of optical connectors refers to an arrangement in which the optical connectors are affixed to a support structure of the backplane infrastructure such that the optical connectors have to be connected to or disconnected from all electronic devices in a system at the same time. This can present an issue when the backplane infrastructure is to be accessed for service (e.g. to repair a defective component) or upgrade (e.g. to replace a component). Having to connect and disconnect a relatively large number of mating optical connectors in a system can result in damage to optical connectors in some cases.

In accordance with some implementations, a connector infrastructure is provided that has multiple connector modules having respective optical connectors, where the connector modules are each moveable between a retracted position (a position in which the respective optical connector is retracted within a support frame of the connector infrastructure) and an extended position (a position in which at least a portion of the optical connector is exposed and outside the support frame of the connector infrastructure to allow for mating with a respective optical connector of an electronic device). Multiple ones of the connector modules are independently actuatable between the retracted position and the extended position, such that some of the connector modules can be in the extended position while others of the connector modules are in the retracted position. In this way, a user can selectively connect some (less than all) of the optical connectors of the connector infrastructure to respective electronic devices mounted in a system. This provides flexibility to allow a user to select which connector module to optically connect to a corresponding electronic device. Also, since less than all optical connectors can be connected or disconnected at one time, the likelihood of damage to an optical connector during connection or disconnection between connector modules and electronic devices is reduced.

Also, during installation of a connector infrastructure according to some implementations, a user can mount the connector infrastructure in the system with the connector modules in their retracted position. After the connector infrastructure has been mounted in the system, a user can incrementally move respective connector modules to their extended position to connect to respective electronic devices. In this way, not all of the optical connectors of the connector infrastructure have to be connected to the electronic devices in the system at one time during connector infrastructure installation, which can reduce the likelihood of damage to optical connectors. Also, better final alignment of the mating optical connectors can be achieved by independently mating the optical connectors.

FIG. 1 illustrates an example system 100 that has a rack 102 that includes various electronic devices 104. The rack 102 includes an external chassis (or frame) containing receptacles 105 into which respective electronic devices 104 can be inserted. Although not shown in FIG. 1, the rear portion of the rack 102 includes a connector infrastructure having connector modules for connecting to electronic devices that have been mounted in the rack 102.

Figure 2:
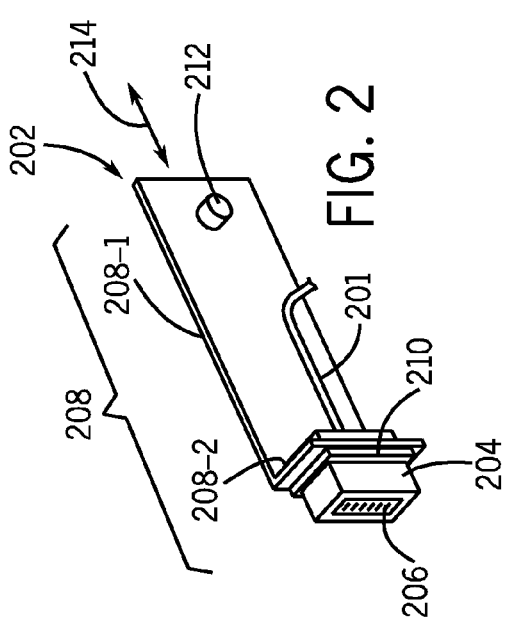
FIG. 2 is a perspective view of a connector module according to some implementations.

FIG. 2 shows a connector module 202 that has an optical connector 204 for connection to a mating optical connector of a respective electronic device (e.g. 104 in FIG. 1). The optical connector 204 has optical elements 206, which can include ferrules. Generally, a "ferrule" of an optical connector refers to an interface for an optical fiber (such as optical fiber 201 depicted in FIG. 2), where the interface allows for optical communication between the optical fiber and another optical component. Although just one optical fiber 201 is depicted in FIG. 2, note that there can be multiple optical fibers in the connector module 202 that are connected to respective ferrules 206 of the optical connector 204. Moreover, the optical connector 204 can also include various lenses and other optical components to allow for optical communications.

As further shown in FIG. 2, the connector module 202 includes a slider 208 that has a first segment 208-1 and a second segment 208-2 that is angled (e.g. generally perpendicular) to the first segment 208-1. The second segment 208-2 has an opening through which the optical connector 204 is mounted, such that the optical connector 204 passes through the opening of the second segment 208-2. An attachment mechanism 210 attaches the optical connector 204 to the second segment 208-2 of the slider 208.

Figure 3C:
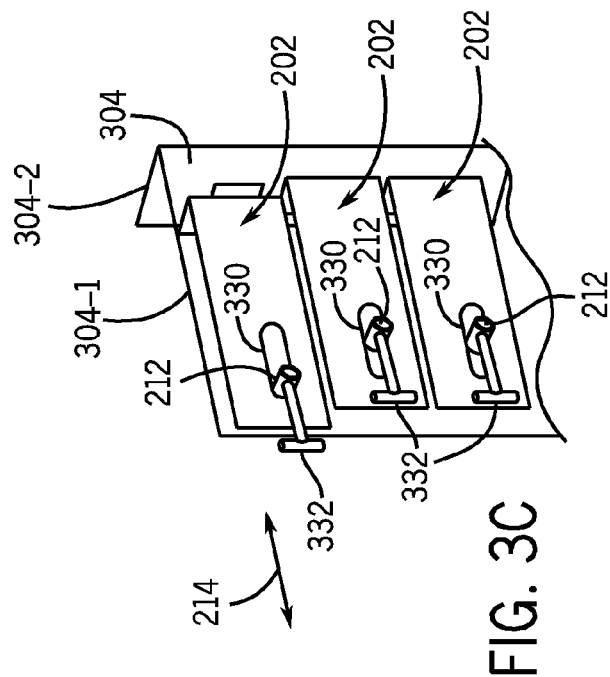
FIG. 3C is a perspective view of a second, opposite side of the connector infrastructure of FIG. 3B.

As further depicted in FIG. 2, an actuator 212 (which can be in the form of a knob, handle, and so forth) is mounted to the first segment 208-1 of the slider 208. The actuator 212 protrudes from the main surface of the first segment 208-1 of the slider 208 to allow for a user to grip the actuator 212 to move the slider 208 in a longitudinal direction 214 of the first segment 208-1 of the slider 208. Note that the actuator 212 also protrudes from the opposite surface of the first segment 208-1, as depicted in FIG. 3C (discussed further below).

In other implementations, other types of sliders (having configurations different from the configuration of the slider 208) can be used on which the optical connector 204 can be mounted, where each such slider can be moved in the directions indicated by 214.

Figure 3B:
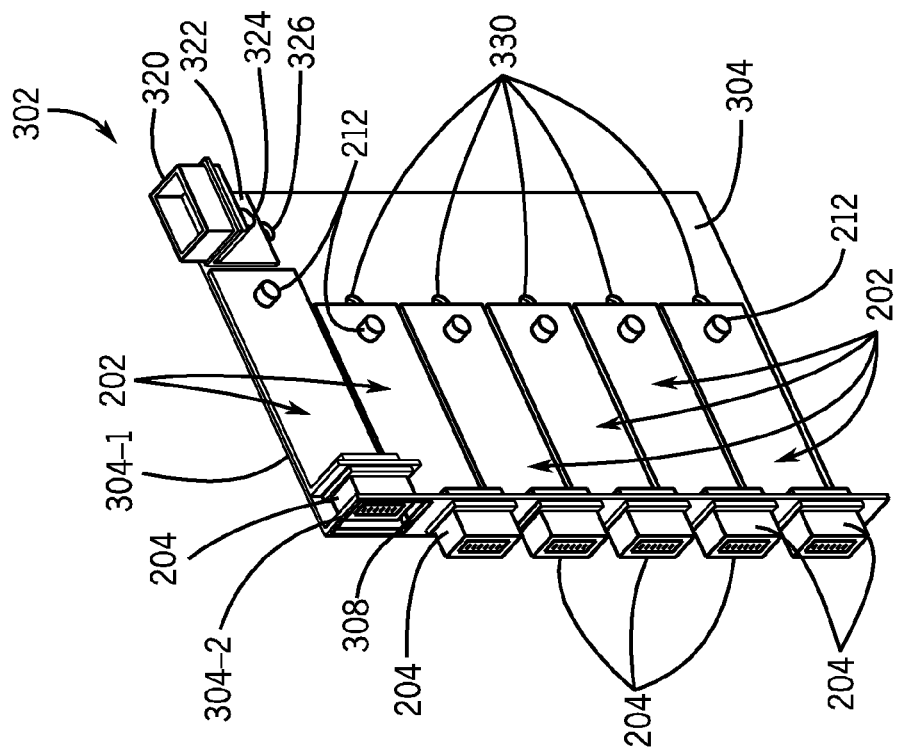
FIGS. 3A-3B are perspective views of a first side of a connector infrastructure having connector modules according to some implementations.
Figure 3A:
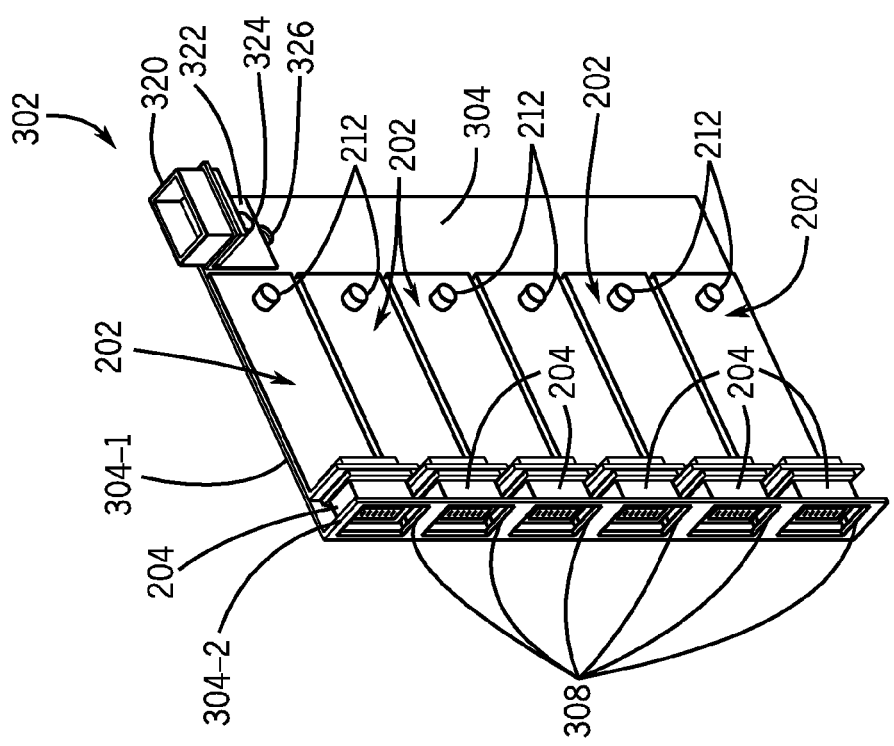

FIGS. 3A-3B depict a connector infrastructure 302 that has multiple connector modules 202. The connector infrastructure 302 has a support frame 304 to which the connector modules 202 are mounted, either directly or indirectly. In FIGS. 3A-3B, and in the various other figures discussed below, optical fibers connected to the optical connectors are omitted from the figures for better clarity. A connector module 202 can be mounted to the support frame 304 using any of various types of attachment mechanisms, such as an attachment mechanism including pins arranged in corresponding grooves, or other types of attachment mechanisms. The connector modules 202 are each slideable with respect to the support frame 304.

The support frame 304 has a first segment 304-1 and a second segment 304-2 that is angled with respect (e.g. generally perpendicular) to the first segment 304-1. The second segment 304-2 of the support frame 304 has openings 308 through which respective optical connectors 204 of the connector modules 202 can extend. When a connector module 202 is in its retracted position, the corresponding optical connector 204 of the retracted connector module 202 is retracted within the support frame 304 of the connector infrastructure 302, and sits behind the opening 308 such that the optical elements of the optical connector 204 are protected from impacting other objects.

To actuate a connector module 202, a user can grip the corresponding actuator 212 to move the connector module 202 towards the second segment 304-2 of the support frame 304. As shown in FIG. 3B, the lower five connector modules 202 are shown in their extended position, in which the optical connectors 210 of each of these connector modules 202 have been pushed through respective openings 308 of the second segment of 304-2 of the support frame 304. When a given connector module 202 is in its extended position, its corresponding optical connector 204 protrudes outwardly from the support frame 304. Moving the optical connector 204 through the corresponding opening 308 of the support frame second segment 304-2 allows the optical connector 204 to be exposed to allow the optical connector 204 to mate with the optical connector of the respective electronic device.

In FIG. 3B, the uppermost connector module 202 remains in its retracted position. Thus, it can be seen that a user can selectively and independently move the connector modules 202 between the retracted position and extended position. In other words, one of the connector modules 202 can be moved from a retracted position to the extended position, while another of the connector modules 202 remains in the retracted position. Similarly, one of the connector modules 202 can be moved from the extended position to the retracted position while another of the connector modules 202 remains in the extended position.

As depicted in both FIGS. 3B and 3C, each actuator 212 is slideable in a respective slot 330 in the first segment 304-1 of the support frame 304. FIG. 3C provides a view of a side of the connector infrastructure 302 that is opposite to the view provided in FIG. 3B. Also, in FIG. 3C, the first segment 304-1 of the support frame 304 is made transparent to allow viewing of the connector modules 202 behind the first segment 304-1. The slot 330 extends generally parallel to the axis 214 shown in FIG. 2, such that each connector module 202 can be moved back and forth along the axis 214.

Also, in examples according to FIG. 3C, a handle 332 is further attached to each actuator 212—a user can grab the handle 332 instead of the actuator 212 to move the actuator 212 along the slot 330. In other implementations, a lever can be used instead of the handle 332 to move a connector module 202.

As shown in FIGS. 3A and 3B, in addition to the connector modules 202, the connector infrastructure 302 further includes another connector module 322 that has an optical connector 320 for optical connection to a corresponding optical connector of another connector infrastructure. The connector module 322 is slideable along a slot 326, which extends along a direction that is different from a direction of the slots 330. In some examples, the slot 326 extends in a first direction that is generally perpendicular to a second direction of the slots 330. The connector module 322 has an actuator 324 that can be gripped by a user to slide the connector module 322 along the slot 326 (between a retracted position and extended position of the connector module 322). The configuration of the connector module 322 that is slideable in the slot 326 is similar to the configuration of the connector module 202 that is slideable in the slot 330, discussed above.

Figure 4:
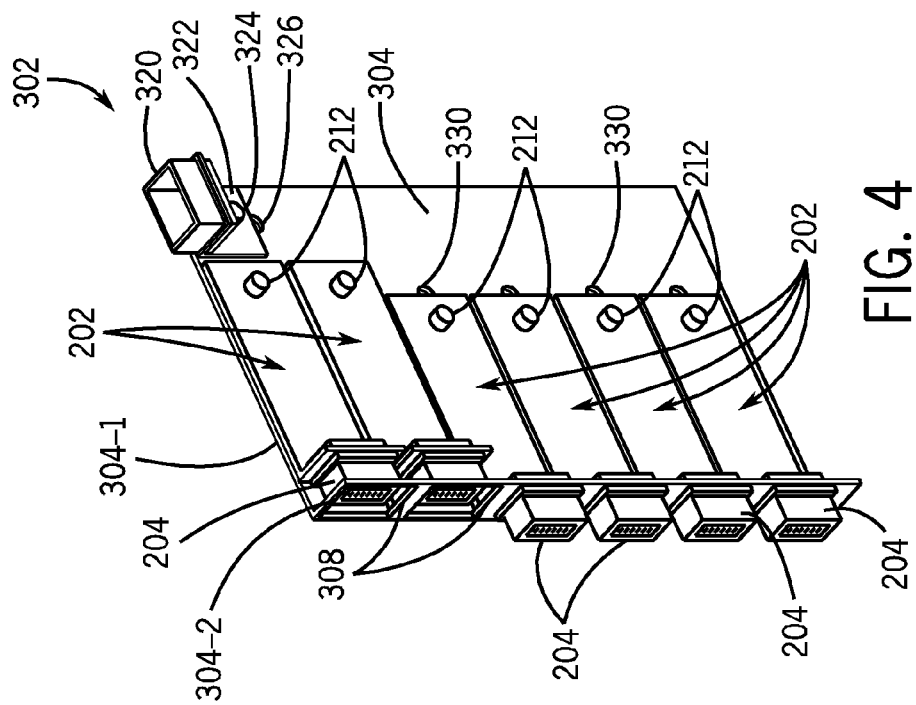
FIG. 4 is a perspective view of a connector infrastructure according to alternative implementations.

FIGS. 3A-3B illustrate an example connector infrastructure 302 in which the connector modules 202 are each individually and independently moveable with respect to each other. In other implementations, as shown in FIG. 4, groups of two or more connector modules 202 can be moved in tandem. In FIG. 4, three such groups are provided, including a first group that includes the upper two connector modules 202, a second group that includes the middle two connector modules 202, and a third group that includes the lower two connector modules 202. The connector modules 202 of each group are fixed with each other (either directly or indirectly), such that the connector modules in the group are moved together (in tandem) between the retracted position and the extended position.

Fixing one connector module to another connector module can be accomplished by using an attachment mechanism to attach the multiple connector modules in fixed relation with one another. For example, a plate can be used that attaches to the multiple connector modules in a group.

In alternative examples, instead of affixing connector modules in a group to each other, an individual connector module can have multiple optical connectors. In other words, instead of groups of multiple connector modules, each group can be considered an individual connector module if this connector module has a slider on which is mounted multiple optical connectors.

FIGS. 5A-5C are rear schematic perspective views of an array of electronic devices 502 and a connector infrastructure 302 according to some implementations. FIG. 5A shows an arrangement in which the connector infrastructure 302 is spaced apart from the electronic devices 502 (and thus not yet engaged with the electronic devices 502). Each electronic device 502 has a respective optical connector 504, which is configured to mate with the optical connector 204 of the corresponding connector module 202 in the connector infrastructure 302.

FIG. 5B shows initial engagement between the connector infrastructure 302 and the connectors 504 of the electronic devices 502 as the connector infrastructure 302 is brought into engagement with the array of electronic devices 502. After the initial engagement depicted in FIG. 5B, a user can selectively actuate the connector modules 202 of the connector infrastructure 302 to push the optical connectors 204 of the respective connector modules 202 through openings in the front segment 304-2 (FIG. 3B) of the support frame 304 such that the optical connectors 204 can mate with the optical connectors 504 of the corresponding electronic devices 502. FIG. 5C shows all of the connector modules 202 of the connector infrastructure 302 engaged to the array of electronic devices 502.

The optical connection between the electronic device 502 and the connector modules 202 can be a blind-mate optical connection. A "blind-mate optical connection" refers to an optical connection in which one connector can be connected to another connector, with alignment between the connectors being automatically performed using alignment features, such that a user does not have to visually align connectors to make the connection.

FIGS. 6A-6C provide a different perspective view of a portion of the array of electronic devices 502 and the connector infrastructure 302, at positions corresponding to those shown in FIGS. 5A-5C, respectively. In each of FIGS. 6A-6C, a portion of the uppermost electronic device 502 has been cut away to provide a better view of two of the optical connectors 504, and their corresponding engagement with connector module optical connectors 204 (as shown in FIGS. 6B and 6C).

Figures 7A, 7B:
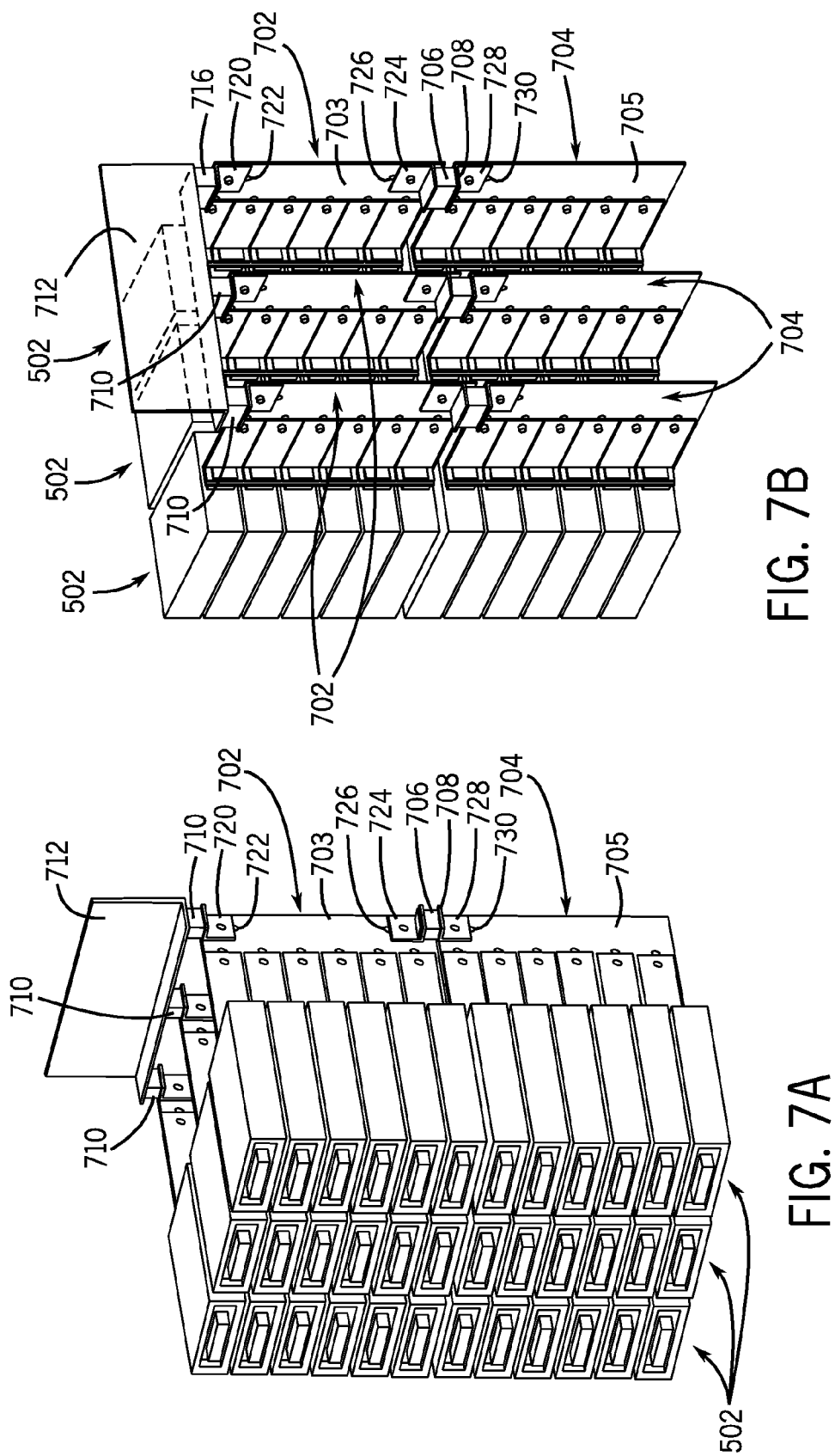
FIGS. 7A-7B are different perspective views of an example system that has electronic devices and connector infrastructures according to some implementations.

FIGS. 7A-7B provide different perspective views of a system having a two-dimensional array of electronic devices 502 connected to various respective connector infrastructures 702, 704. Each connector infrastructure 702 and 704 is arranged similarly to connector infrastructure 302 (discussed above). However, in examples according to FIGS. 7A-7B, the connector infrastructure 702 is provided with an interconnecting optical connector 706 for optical connection with a corresponding interconnecting optical connector 708 of the connector infrastructure 704.

The interconnecting optical connector 706 is provided on a slider 724 that is slideable along a slot 726 in the support frame 703 of the connector infrastructure 702. Similarly, the interconnecting optical connector 708 is provided on a slider 728 that is slideable along a slot 730 in the support frame 705 of the connector infrastructure 704. The sliders 724 and 728 that are slideable in respective slots 726 and 730 are similarly configured as the slider 208 and slot 330 discussed above in connection with FIGS. 2 and 3A-3C.

Thus, as shown in FIGS. 7A and 7B, pairs of connector infrastructures (702, 704) are connected to each column of electronic devices 502. The connector infrastructures (702, 704) in each pair are optically connected to each other using the interconnecting optical connectors 706 and 708. In addition, the connector infrastructure 702 further has an interconnecting optical connector 710 for connecting to a bridge connector infrastructure 712. The bridge connector infrastructure 712 is further optically connected to interconnecting optical connectors 710 of the other two connector infrastructures 702 depicted in FIGS. 7A and 7B. The bridge connector infrastructure 712 allows the electronic devices 502 to communicate with each other and with another entity that may be external of the system depicted in FIGS. 7A and 7B. The interconnecting optical connectors 710 are arranged on respective sliders 720 that are slideable along corresponding slots 722. Such configuration is similarly to the configuration of the slider 208 and slot 330 discussed above in connection with FIGS. 2 and 3A-3C.

The arrangement shown in FIGS. 7A and 7B provides a greater level of granularity, in that multiple ones of the connector infrastructures 702 and 704 are connected to respective subsets of electronic devices 502. In this manner, an individual connector infrastructure (702 or 704) can be removed without having to remove other connector infrastructures, which provides enhanced flexibility.

The ability to independent actuate individual or groups of connector modules in the connector infrastructures according to various implementations discussed above allows for easier connection/disconnection of connector infrastructures while reducing the likelihood of damage to optical connectors. Moreover, by employing multiple connector infrastructures (that are connected together) in a system (such as depicted in FIGS. 7A-7B), scalability can be enhanced. Also, smaller connector infrastructures can be employed, which can improve ease of handling and shipping.

Figure 8:
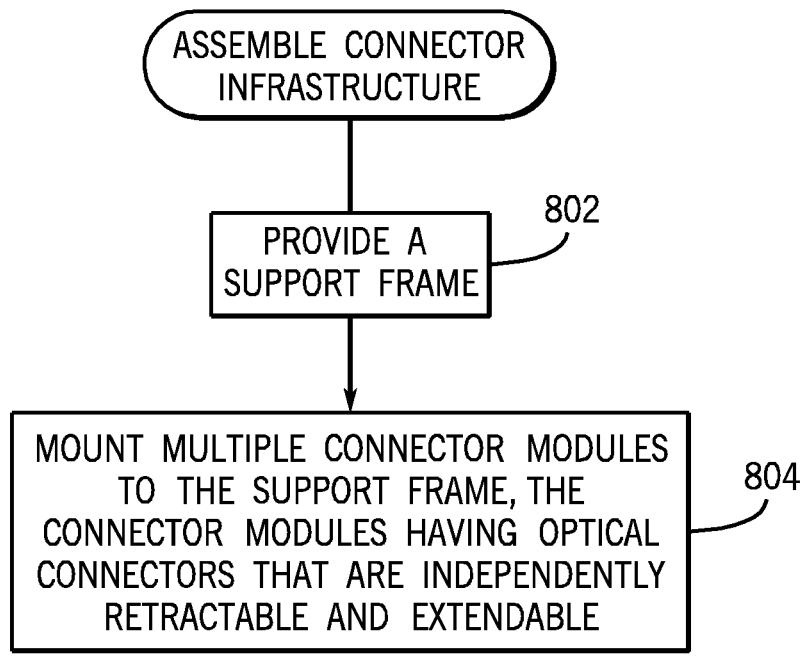
FIG. 8 is a flow diagram of assembling a connector infrastructure according to some implementations.

FIG. 8 is a flow diagram of a process of assembling a connector infrastructure (as discussed above) according to some implementations. The process of FIG. 8 can be performed at a manufacturing facility of the connector module 108, or alternatively, the process of FIG. 8 can be performed by another entity for assembling the connector module 108.

The process of FIG. 8 provides (at 802) a support frame (e.g. support frame 304 shown in FIGS. 3A-3B) of the connector infrastructure. The process then mounts (at 804) multiple connector modules (e.g. 202 in FIGS. 3A-3B) to the support frame, where the connector modules have respective optical connectors that are independently retractable and extendable.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A connector infrastructure comprising:
   a support frame comprising a plurality of first slots and a second slot, the second slot extending in a direction generally perpendicular to a direction of the first slots;
   a plurality of connector modules mounted to the support frame and having respective optical connectors to optically connect with respective electronic devices, wherein the optical connectors are moveable between a retracted position and an extended position along respective slots of the first slots, and wherein the optical connector of a first of the connector modules is retractable and extendable independently of a second of the connector modules; and
   a further connector module slideable between a first position and a second position along the second slot.

2. The connector infrastructure of claim 1, wherein the further connector module when in the second position is to connect to a connector module of a second connector infrastructure, and wherein the further connector module when in the first position is disconnected from the connector module of the second connector infrastructure.

3. The connector infrastructure of claim 2, wherein the further connector module comprises an optical connector.

4. The connector infrastructure of claim 1, wherein the first connector module is part of a first group of the plurality of connector modules, and the second connector module is part of a second group of the plurality of connector modules, and wherein the optical connectors of the first group are retractable and extendable together independently of the optical connectors of the second group.

5. The connector infrastructure of claim 1, wherein the support frame has openings through which respective ones of the optical connectors of the plurality of connector modules are to extend when the respective connector modules are in the extended position.

6. The connector infrastructure of claim 1, wherein each of the plurality of connector modules has an actuator that is user-actuatable to move the corresponding connector module between the retracted position and the extended position, and the further connector module has an actuator that is user-actuatable to move the further connector module between the first position and the second position.

7. The connector infrastructure of claim 1, wherein the further connector module is moveable along the direction of the second slot, and the plurality of connector modules are moveable along the direction of the first slots.

8. A system comprising:
   a first connector infrastructure comprising:
      a support frame;
      a plurality of connector modules mounted to the support frame and having respective optical connectors to optically connect with respective electronic devices, wherein the optical connectors are moveable between a retracted position and an extended position along a first direction, and wherein the optical connector of a first of the connector modules is retractable and extendable independently of a second of the connector modules; and
      a further connector module mounted to the support frame, wherein the further connector module has an optical connector and is movable between a retracted position and an extended position along a second direction that is generally perpendicular to the first direction; and
   a second connector infrastructure having a connector module to optically connect to the optical connector of the further connector module.

9. The system of claim 8, wherein the connector module of the second connector infrastructure is moveable between a retracted position and an extended position.

10. The system of claim 8, wherein the support frame comprises:
    a first portion including slots along which corresponding ones of the plurality of connector modules are slideable, and
    a second portion angled with respect to the first portion, the second portion having openings through which corresponding ones of the optical connectors of the plurality of connector modules extend when in the extended position.

11. The system of claim 10, wherein the first portion includes a further slot along which the further connector module is slideable.

12. The system of claim 8, wherein the support frame includes first slots extending along the first direction, and a second slot extending along the second direction, the optical connectors of the plurality of connector modules moveable along respective slots of the first slots, and the further connector module moveable along the second slot.

13. The system of claim 8, further comprising a bridge connector infrastructure optically connected to the second connector infrastructure, the system further comprising:
    a third connector infrastructure comprising:
       a support frame;
       a plurality of connector modules mounted to the support frame of the third connector infrastructure and having respective optical connectors to optically connect with respective electronic devices; and
       a further connector module mounted to the support frame of the third connector infrastructure, wherein the further connector module of the third connector infrastructure has an optical connector to optically connect to the bridge connector infrastructure.

14. The system of claim 8, further comprising the electronic devices, wherein selected ones of the plurality of connector modules are moveable to the extended position to optically connect to the electronic devices while leaving others of the plurality of connector modules in the retracted position, the connector modules in the retracted position not optically connected to the corresponding electronic devices.

15. A method of assembling a connector infrastructure, comprising:
    providing a support frame;
    mounting a plurality of connector modules to the support frame, the connector modules having respective optical connectors to optically connect with respective electronic devices, wherein the optical connectors are moveable between a retracted position and an extended position along respective first slots of the support frame, the first slots extending in a first direction, and wherein the optical connector of a first of the connector modules is retractable and extendable independently of a second of the connector modules; and
    mounting a further connector module to the support frame, the further connector module moveable along a second slot between a retracted position and an extended position, the second slot extending in a second direction generally perpendicular to the first direction.

16. The method of claim 15, wherein the further connector module when in the second position is to connect to a connector module of a second connector infrastructure, and wherein the further connector module when in the first position is disconnected from the connector module of the second connector infrastructure.

17. The method of claim 16, wherein the further connector module comprises an optical connector.

18. The method of claim 15, further comprising providing openings in the support frame through which respective ones of the optical connectors of the plurality of connector modules are to extend when the respective connector modules are in the extended position.

* * * * *